(12) United States Patent
Fujimoto et al.

(10) Patent No.: US 7,616,406 B2
(45) Date of Patent: Nov. 10, 2009

(54) DISK APPARATUS AND MAGNET FOR MAGNETIC CIRCUIT

(75) Inventors: Shinji Fujimoto, Kawasaki (JP); Hiroshi Ishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 552 days.

(21) Appl. No.: 11/528,816

(22) Filed: Sep. 28, 2006

(65) Prior Publication Data

US 2007/0297095 A1 Dec. 27, 2007

(30) Foreign Application Priority Data

Jun. 26, 2006 (JP) .............................. 2006-175174

(51) Int. Cl.
*G11B 5/54* (2006.01)
(52) U.S. Cl. .................................................. 360/256.2
(58) Field of Classification Search ............. 360/256.2, 360/254.8, 245.9, 265.1, 265.7, 256.3
See application file for complete search history.

(56) References Cited

U.S. PATENT DOCUMENTS 5,666,244 A * 9/1997 Ogawa ..................... 360/256.2
5,675,455 A * 10/1997 Matsumoto ............... 360/256.2
5,694,271 A * 12/1997 Stefansky ................. 360/256.3
7,298,591 B2 * 11/2007 Matsumura et al. ...... 360/256.2
7,532,439 B2 * 5/2009 Byun et al. ............... 360/256.4

FOREIGN PATENT DOCUMENTS

JP          06-012803       1/1994
JP          09-115257       5/1997

* cited by examiner

*Primary Examiner*—Allen T Cao
(74) *Attorney, Agent, or Firm*—Greer, Burns & Crain, Ltd.

(57) ABSTRACT

A rotary type actuator comprises an actuator assembly rotatably attached to a base and supporting a head at an end thereof via an arm and supporting a coil at the other end thereof, and a magnetic circuit unit having a yoke and a magnet secured to the base. The latch mechanism has a projection arranged from the inner periphery of the magnet provided in the magnetic circuit toward the rotational center and a latching magnet which produces an attraction force directed toward the latch position caused by leaking magnetic flux between itself and the projection near the latch position where the actuator assembly is in contact with the stopper and holds it at the latch position.

14 Claims, 17 Drawing Sheets

DISK APPARATUS AND MAGNET FOR MAGNETIC CIRCUIT

This application is a priority based on prior application No. JP 2006-175174 filed Jun. 29, 2006, in Japan.

BACKGROUND OF THE INVENTION

1. Field of the Invention

The present invention relates to a disk apparatus for positioning a head in an arbitrary track on the disk recording surface. More particularly, the invention relates to a disk apparatus having a latch mechanism for retracting and holding the head at a latch position during inactivation.

2. Description of the Related Art

In a rotary type actuator of a magnetic disk apparatus, it is the conventional practice to rotatably attach an actuator assembly which supports the head at the leading end and having a coil at a rear end thereof to an enclosure base by a shaft, arrange the actuator assembly coil relative to a magnetic circuit unit composed of a magnet secured to the enclosure base and a yoke to form a voice coil motor, and recording or reproducing data by positioning the head at an arbitrary track on the disk recording surface by means of driving by the voice coil motor.

Such a rotary type actuator of a magnetic disk apparatus has a latch mechanism which retracts and holds the head into a ramp load mechanism arranged, for example, on the outer periphery of the disk in an inactive state in which the unit is in stoppage.

Known conventional latch mechanisms in a rotary type actuator include:

(1) Magnet latch mechanism, and (2) Mechanical latch mechanism.

FIG. 1 illustrates an example of the conventional magnet latch mechanism, in which a rotary type actuator 100 has an arm 104 provided in front of a shaft 102, and a head 122 is supported at the leading end of the arm 104 via a suspension 120. Behind the shaft 102 of the rotary type actuator 100, a coil arm 106 is formed to which a coil 108 is attached.

A magnetic circuit unit composed of a yoke and a magnet is secured to an enclosure base 101 facing a coil 108 of the rotary type actuator 100. In FIG. 1, an upper yoke is omitted, showing a magnet 110 positioned below the coil 108 and a lower yoke 111.

A magnet latch 124 having rubber 132 wound around the magnet is arranged in the enclosure base 101 behind the rotary type actuator 100. In the state shown, the rotary type actuator 100 is at a latch position where the head 122 at the leading end is rotated in a ramp load mechanism 126. At this point in time, a magnet 128 attached to the leading end of a latch arm 112 extending from the coil arm 106 behind the rotary type actuator 100 attracts a magnet latch 124 via the rubber 132, and holds it at the latch position.

FIG. 2 illustrates an example of the conventional mechanical latch mechanism. A latch arm 134 is arranged in the enclosure base 101 behind the rotary type actuator. The latch arm 134 is an arcuate member rotatably supported by a shaft 136 has steel balls 138 and 140 attached to both ends. A lever 142 projects on the steel ball 138 side, and an operating lever 144 projects from the coil arm 106 toward the lever 142.

When this mechanical latch mechanism drives the rotary type actuator 100 clockwise and retracts the head 122 into the ramp load mechanism 126, the operating lever 142 projecting from the coil arm 106 pushes the lever 144. As a result, the latch arm 134 revolves anticlockwise, presses the steel ball 140 against the magnet 110 and holds it at the latch position.

Various other latch mechanisms are available apart from the above, and latch mechanism in general can be broadly classified into magnet latch mechanisms and mechanical latch mechanisms.

However, such latch mechanisms of the conventional rotary type actuator suffer from the following problems.

In the magnet latch mechanism shown in FIG. 1, in which the magnet latch 124 is arranged far from the actuator rotation center, increased inertial moment leads to a lower head speed upon seek operation.

The rotary type actuator 100 is pressed strongly against the rubber 132 of the magnet latch by attraction force of the magnet latch. When the coil arm 106 attracts the rubber 132 of the magnet latch 124, causing separation from the latch position and start of seek operation, therefore, an attraction trouble may be caused in which it is not separated from the magnet latch 124.

It is necessary to arrange a latching magnet 128 comprising another member, resulting in an increase in the number of parts and a design limitation. Furthermore, contact between the rubber 132 wound on the magnet latch 124 and the rotary type actuator 100 side may cause contamination by peeled pieces generated by the contact adhering to the disk.

In the mechanical latch mechanism shown in FIG. 2, as in the magnet latch mechanism, the increase in the inertial moment is a problem, and in addition, it is necessary to arrange component parts for latching. This leads to problems of an increased number of parts, and hence to an increase in the number of assembling processes, and of a large design limitation in space.

SUMMARY OF THE INVENTION

According to the present invention to provide a disk apparatus having a latch mechanism which is small in inertial moment of the rotary actuator, free from an attraction trouble with a stopper pin, permits reduction of the number of parts, and makes it possible to increase the degree of design freedom in space.

(Latch Mechanism)

According to the present invention, there are provided a disk apparatus comprising an actuator assembly which is rotatably attached to an enclosure base, supports a head at an end thereof via an arm, and supports a coil at the other end thereof; and a magnetic circuit unit which is secured to the enclosure base and has a yoke and a magnet;

wherein the disk apparatus further comprises:

an attracting member which is arranged at a position from an inner peripheral end of a magnet provided in the magnetic circuit unit toward a rotational center; and a latch member which generates an attraction force directed toward the latching position between the attracting member and itself near a latching position where the actuator assembly is in contact with a stopper.

In the above-mentioned disk apparatus, the attracting member is a projection which is a partial extension of a substantially arcuate inner peripheral end of the magnet, directed toward the rotational center. The attracting member may be a step formed at a substantially arcuate inner peripheral end of the magnet. This step is formed by overlapping into a substantially arcuate shape from a prescribed position of the magnet.

The attracting member and a latching member are arranged so that the attraction force becomes the maximum immediately before latching position, and is reduced according as these members approach the latching position where they come into contact with the stopper.

The attracting member and the latching member are arranged so that the attraction force becomes the maximum at a position where the projection and the latching member become the closest to each other without overlapping each other, the attraction force becoming lower according as the extent of overlapping of the projection and the latching member becomes larger, and the attraction force becomes substantially null at the latching position where it comes into contact with the stopper.

The latching member may be inserted and held between the coil arm of the actuator assembly and the coil and secured here. The latching member may be attached to the coil arm of the actuator assembly or to the coil inner periphery of the actuator assembly.

The attracting member may be provided in the yoke of the magnetic circuit so as to generate attraction force near the latching position under the effect of leaking magnetic flux.

The actuator assembly has a latching position set at a position where the head is retracted in a ramp mechanism arranged at a position off the outer periphery of a disk medium. This includes a case where the actuator assembly has a latching position set at a position where the head is retracted in a constant start/stop region of the innermost periphery of the disk medium.

(Improvement of Blr Property)

In another embodiment of the present invention, the Blr property known as the torque constant is improved at a position opposite to the latching position in the rotary type actuator. In this term "Blr", B represents a magnetic flux density, l, the effective length of coil overlapping the magnetic circuit unit in the radial direction, and r, power point radius of the coil.

The present invention provides a disk apparatus comprising an actuator assembly which is rotatably attached to an enclosure base, supports a head at an end thereof via an arm, and supports a coil at the other end thereof; and a magnetic circuit unit which is secured to the enclosure base and has a yoke and a magnet;

wherein the disk apparatus further comprises:

a latching member provided in the actuator assembly so as to generate an attraction force in a direction leaving the stopper pin when the actuator assembly is at a position in contact with the stopper pin on the side opposite to the latching position and the proximity thereof.

In another embodiment of the present invention, the Blr property which is known as the torque constant is improved at the latching position in the rotary type actuator.

The present invention therefore provides a disk apparatus comprising an actuator assembly which is rotatably attached to an enclosure base, supports a head at an end thereof via an arm, and supports a coil at the other end thereof; and a magnetic circuit unit which is secured to the enclosure base and has a yoke and a magnet;

wherein the disk apparatus further comprises:

a projection or a step provided in the magnet so as to expand the effective length of the coil of the actuator assembly relative to the magnetic circuit when the actuator assembly is at a position in contact with the stopper pin at the latching position and the proximity thereof.

In still another embodiment, the present invention provides a magnet for a magnetic circuit of a disk apparatus which rotation-drives an actuator assembly supporting a head at an end via an arm and supporting a coil at the other end, wherein:

there is provided a projection or a step extending from the substantially arcuate inner peripheral end toward the rotational side of the actuator assembly.

At a position near the rotational center of the rotary type actuator, an attracting member comprising a projection or a step of the magnet or the yoke of the magnetic circuit unit and a latching magnet on the actuator side are provided. The head speed upon seek operation can therefore be increased by minimizing the rotational radius from the rotational center to the latching position, and reducing the inertial moment upon separating it from the latch position.

When the latching magnet on the actuator side moves to the latch position, the attraction force by leaking magnetic flux becomes the maximum at a position in front of the latch position, and subsequently, the attraction force is reduced according as the latch position becomes closer. In an optimum arrangement, the attraction force at the latch position can be reduced to almost null. Thus, the force pressing against the stopper at the latch position can be reduced, permitting reliable prevention of occurrence of an attraction trouble of adhesion of the actuator side to the stopper making it impossible to separate them.

Among the parts composing the latch mechanism, an attracting member such as a projection or a step is formed integrally with the magnet or the yoke of the magnetic circuit unit, and in correspondence to this, a latching magnet is attached on the actuator assembly side. These are the only required operations. The number of parts is therefore minimum, permitting reduction of cost.

As compared with the conventional magnet latch mechanism or mechanical latch mechanism, latching members can be accommodated in the actuator in a compact manner. This makes it possible to increase the degree of freedom in designing spaces.

The latching magnet, on the actuator side, provided in the latch mechanism of the present invention, if the action of the latching magnet alone is viewed, leads to a decrease in the Blr property known as the torque constant of the rotary type actuator at a position where the coil on the side opposite to the latching position approaches an end of the magnetic circuit unit. This decrease in Blr property can be made up with the attraction force of the latching magnet exerting on leaking magnetic flux from the magnetic circuit, thereby practically permitting improvement of the Blr at a position opposite to the latching position.

The latching projection provided on the magnet of the magnetic circuit of the present invention, when viewed for a projection alone, if the rotary type actuator is retracted to the latching position, causes the effective length l of the coil relative to the magnet to increase by a length corresponding to the projection provided on the magnet of the magnetic circuit, thus making it possible to achieve improvement by compensating the decrease in Blr property caused by positioning of the coil at an end of the magnetic circuit at its latching position.

The above and other objects, features, and advantages of the present invention will become more apparent from the following detailed description with reference to the drawings.

DETAILED DESCRIPTION OF THE PREFERRED EMBODIMENTS

Figure 1:
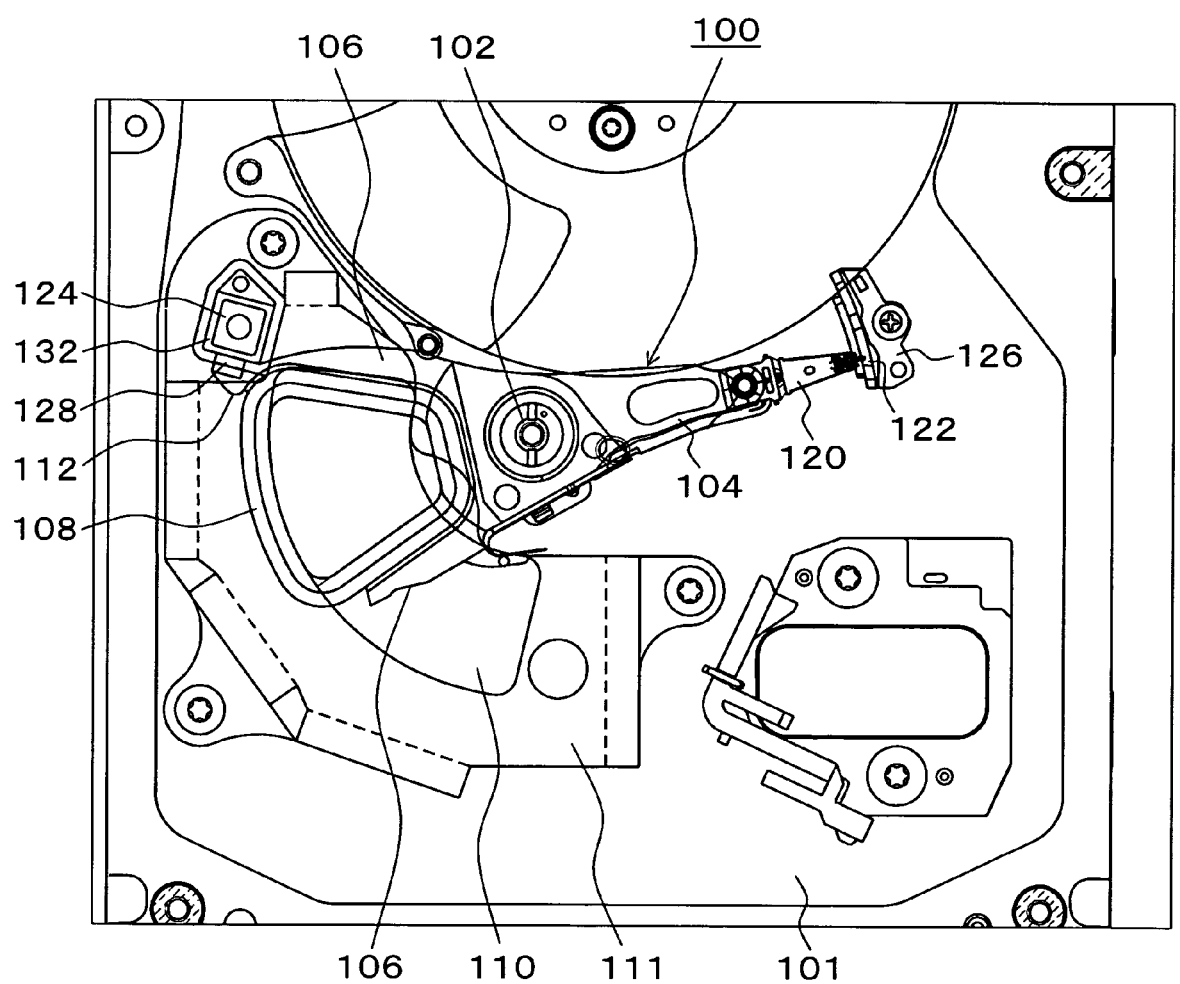
FIG. 1 is a descriptive view of a conventional rotary actuator having a magnet latching mechanism.
Figure 2:
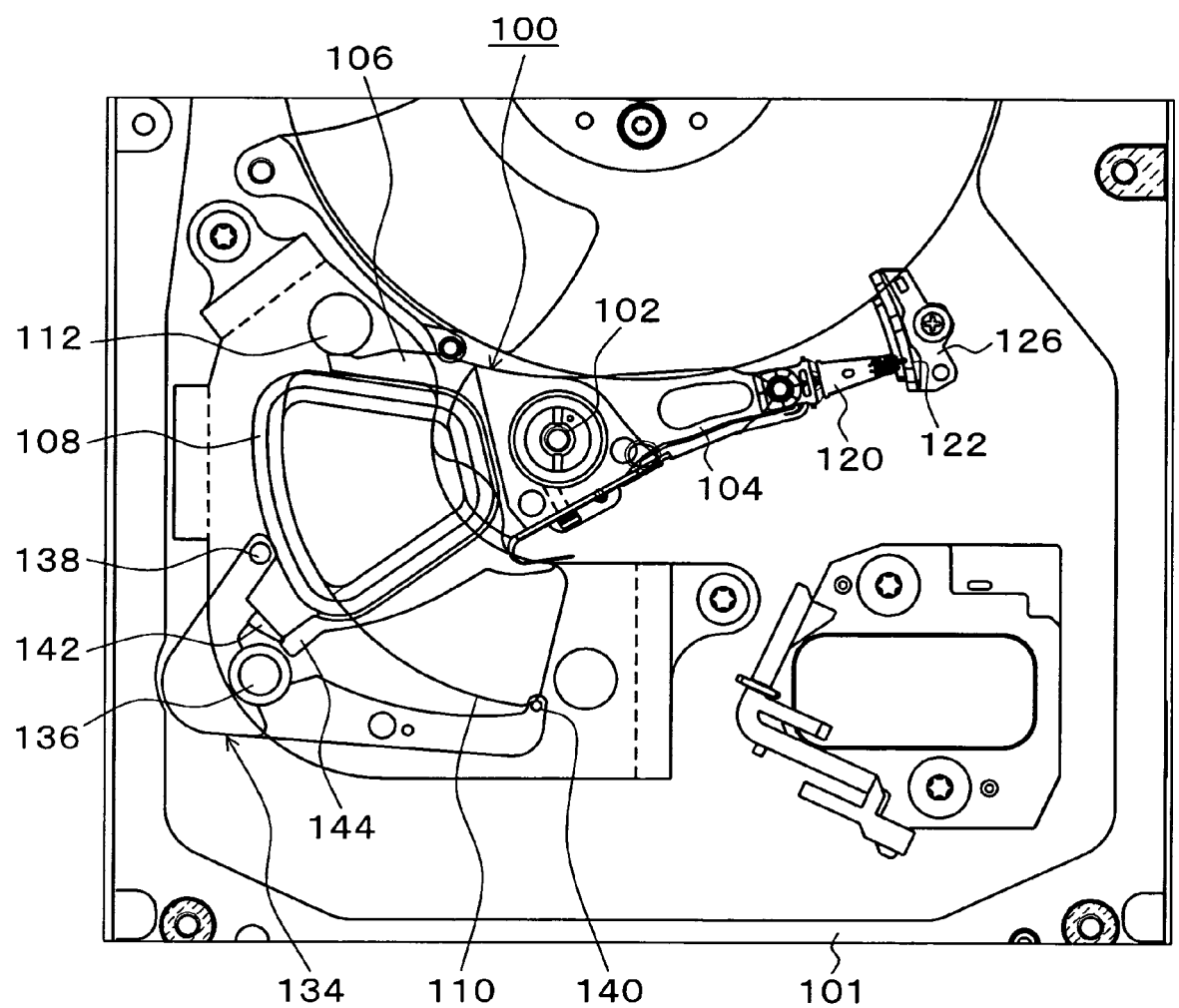
FIG. 2 is a descriptive view of the conventional rotary actuator having a mechanical latching mechanism.
Figure 3:
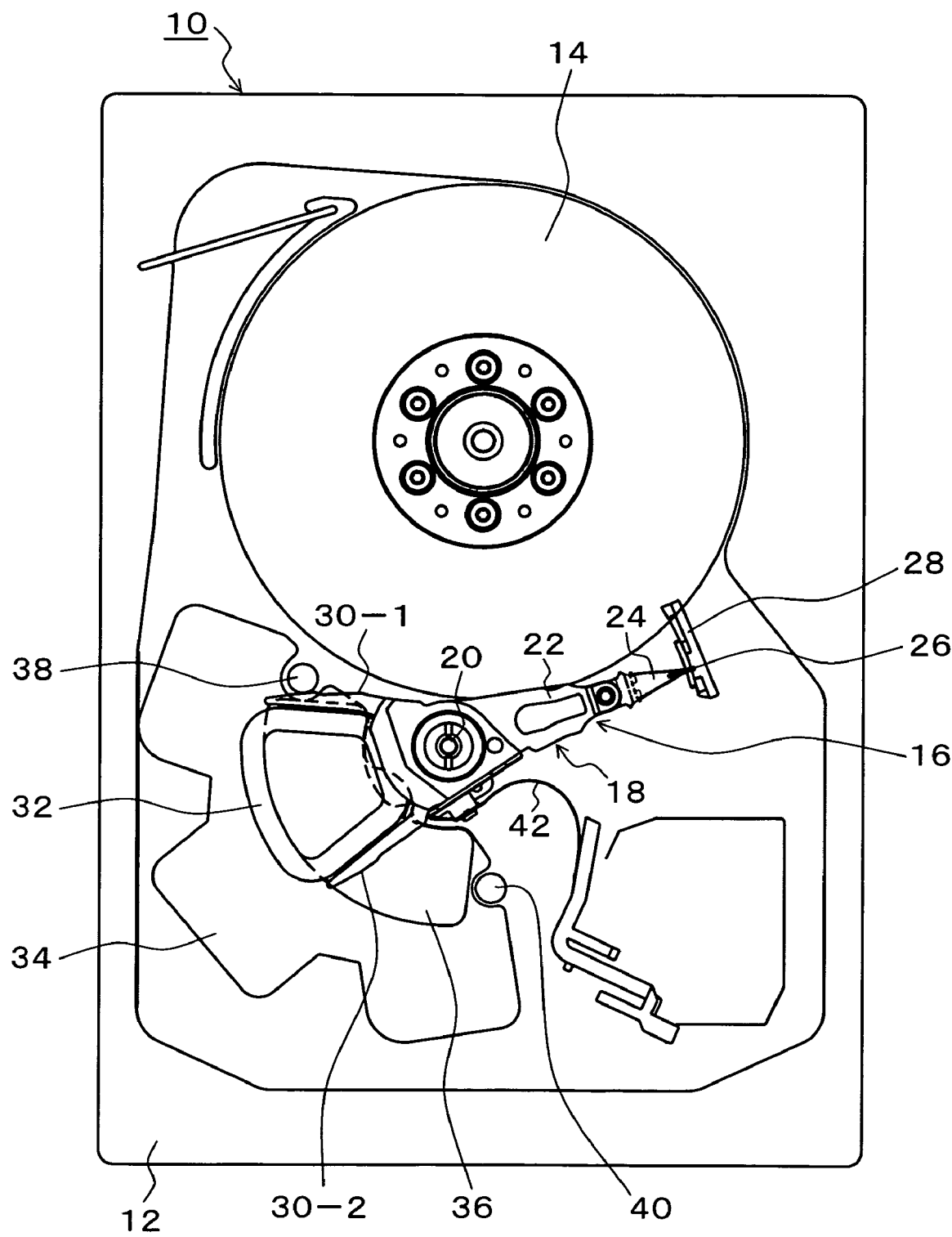
FIG. 3 is a descriptive view of a magnetic disk apparatus having a rotary actuator attached thereto of the present invention.

FIG. 3 is a descriptive view of the magnetic disk apparatus having a rotary actuator attached thereto of the present invention, illustrating the inside structure on the enclosure base side by removing an enclosure cover. In FIG. 3, a magnetic disk apparatus 10 has a magnetic disk 14 rotated at a constant speed by a spindle motor, provided in an enclosure base 12. For the magnetic disk 14, the rotary type actuator 16 of the present invention is provided. The rotary type actuator 16 is rotatably attached to the enclosure base 12 by means of a shaft 20, supporting, on the leading end side, an arm 22, and further, a head 26 via a suspension 24. On the rear end side, a coil 32 is attached by coil arms 30-1 and 30-2. A magnetic circuit unit secured to the enclosure base 12 is provided on the coil 32 side of the rotary actuator 16. The coil 32 and the magnetic circuit unit compose a voice coil motor which drives the rotary type actuator 16. The magnetic circuit unit on the enclosure base 12 side has a magnet 36 arranged on top of a lower yoke 34 fixed to the enclosure base 12. The magnet 36 has a shape which covers the revolving range of the coil 32 by the rotary type actuator 16.

Above the magnet 36, the coil 32 on the rear of the rotary type actuator 16 is revolvably positioned around a shaft 20. Above the coil 32, an upper yoke having the same shape as the lower yoke 34 in correspondence thereto is arranged. In FIG. 3, a state in which the upper yoke is removed and omitted is illustrated. In the state shown, the rotary type actuator 16 is held at a latch position with the outer side of the coil arm 30-1 in contact with a stopper pin (outer stopper pin) 38. In this holding state of the latch position, the head 26 at the leading end is retracted into a ramp load mechanism 28. From the non-operating period when the rotary type actuator 16 is held at the latch position shown until the seek operation for positioning it on an arbitrary track of the magnetic disk 14, a driving force is generated for causing anticlockwise revolving of the rotary type actuator 16 by energizing the coil 32. The head 26 is loaded from the ramp load mechanism 28 onto the magnetic disk 14 to conduct seek operation to a target track, and then, on-track control is started. Another stopper pin (inner stopper pin) 40 is arranged to the right of the rotary actuator 16. The stopper pin 40 is in contact with the outer side of the coil arm 30-2 at the innermost position of the rotary type actuator 16 to perform control so that the rotary type actuator 16 does not move further toward inside. An FPC 42 is pulled out from the side of the rotary type actuator 16 toward the circuit package side of the fixed side. A signal line to the head 26 and a signal line to the coil 32 are formed in the form of flexible printed patterns on the FPC 42 to conduct exchange of control signals, write signals and read signals with a control board not shown, packaged on the enclosure base 12 side.

Figure 4:
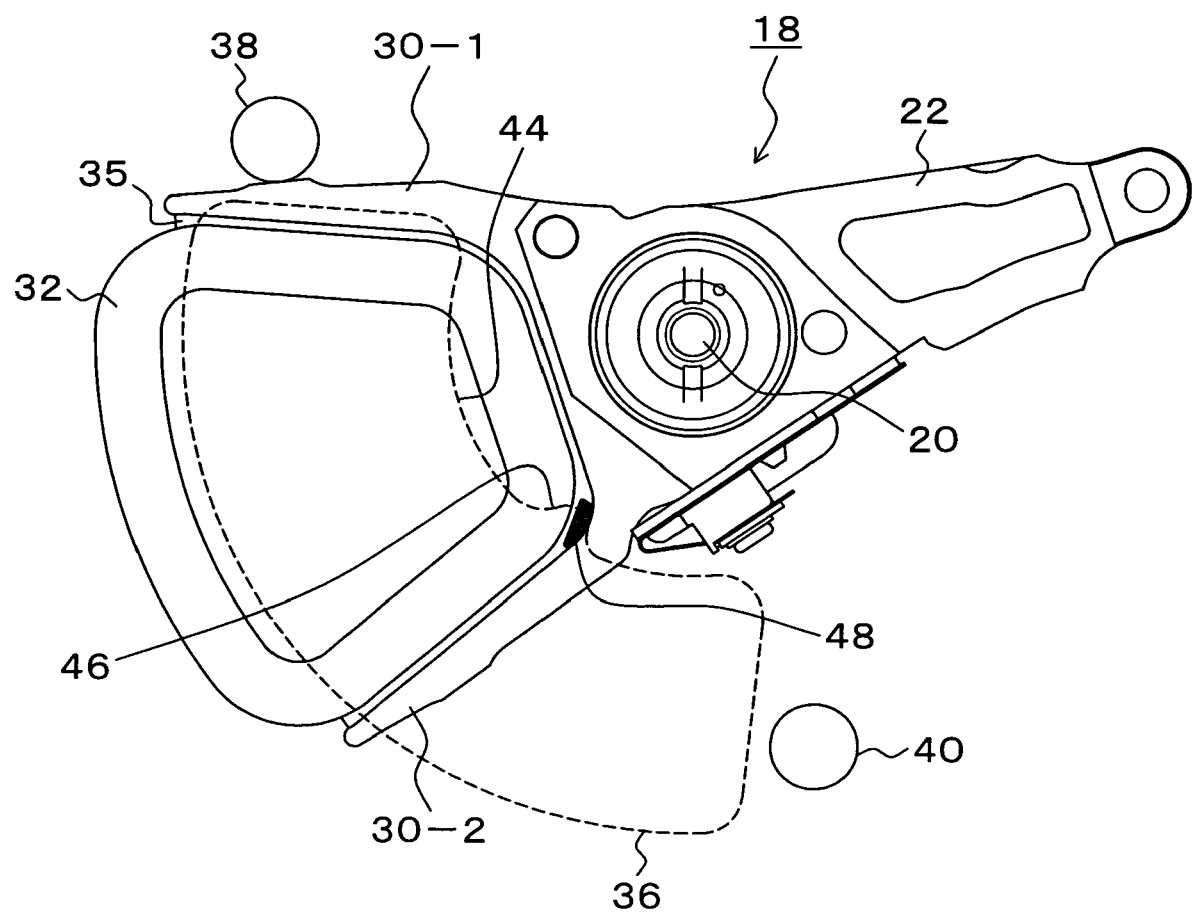
FIG. 4 is a descriptive view of an embodiment of the rotary actuator of the resent invention.

FIG. 4 is a descriptive view of an embodiment of the rotary actuator of the present invention, illustrating the portion of the actuator assembly 18 of the rotary type actuator of FIG. 3. The actuator assembly 18 is arranged rotatably on the enclosure base 12 via the shaft 20. It has an arm 22 attached on the leading end thereof, and a coil 32 secured by a bond layer 35 on the rear side by means of coil arms 30-1 and 30-2. It may be secured by a mold in place of the bond layer 35. In this embodiment, as a latch mechanism holding the rotary actuator 16 at a latch position shown where the actuator assembly 18 is in contact with the stopper pin 38, a projection 46 serving as an attraction member is formed on the magnet inner periphery 44 of the magnet 36 toward the rotational center of the shaft 20, and a latching magnet 48 serving as a latching member is attached at a position on the foot inside the coil arm 32 side overlapping the portion of the projection 46 at the latch position shown. The projection 46 serving as the attracting member is provided integrally with the magnet 36 in this embodiment. An attracting member may however be provided as a separate member. As a latching magnet 48 functioning as latching member, a latching magnetic material using an appropriate magnetic material other than a magnet may be used.

Figure 5:
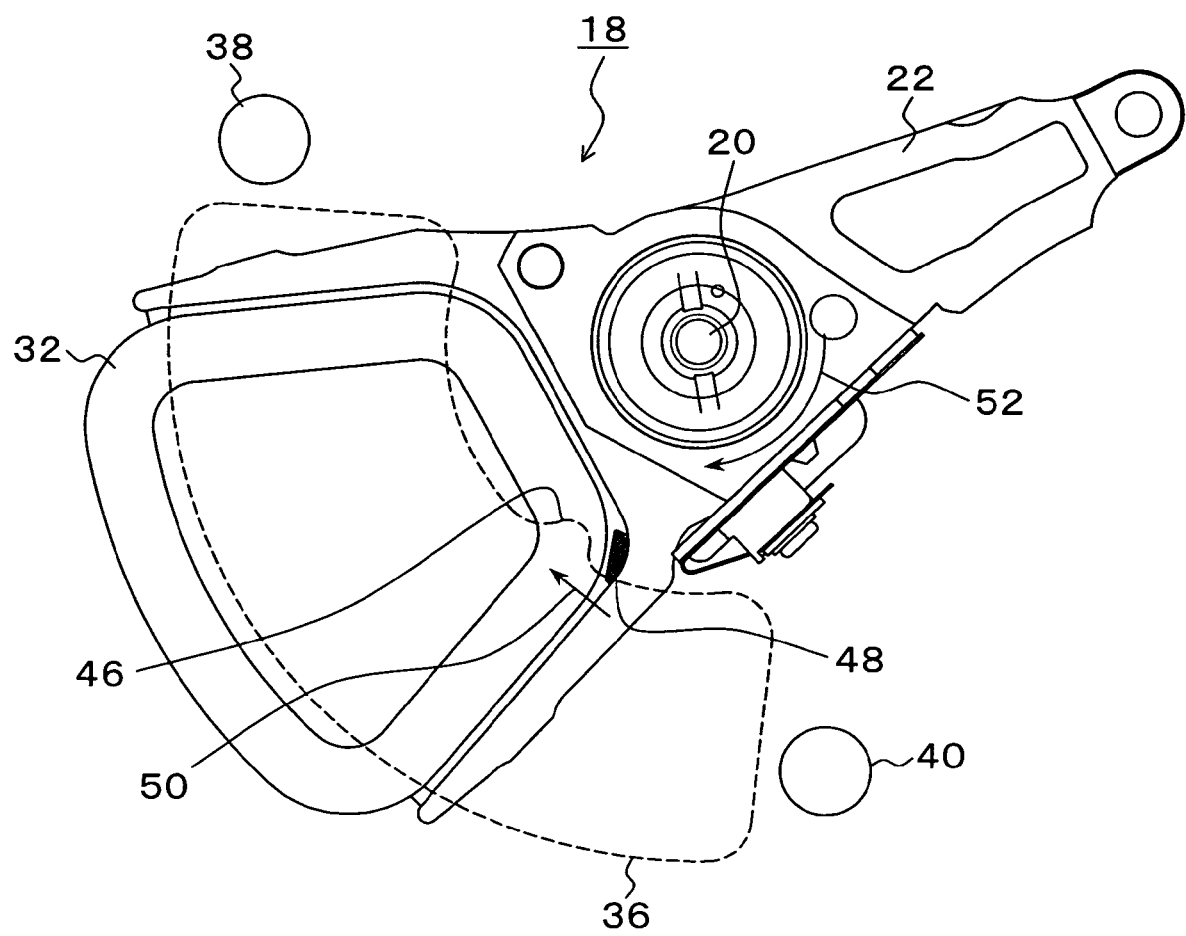
FIG. 5 is a descriptive view of an embodiment illustrating a position on this side of the latching position.

FIG. 5 illustrates a state in which the actuator assembly 18 in the embodiment shown in FIG. 4 is positioned in front of the latch position. In the state shown in FIG. 5, an attraction force 50 attracting the latching magnet 48 to the projection 46 shown by an arrow is generated by leaking magnetic flux from the magnet 36 between the projection 46 provided on the magnet inner periphery 44 of the magnet 36 and the latching magnet 48 of the actuator assembly 18 provided in correspondence thereto. This attraction force 50 produces a latch torque 52 anticlockwise as indicated by an arrow relative to the shaft 20 in the actuator assembly 18.

Figure 6:
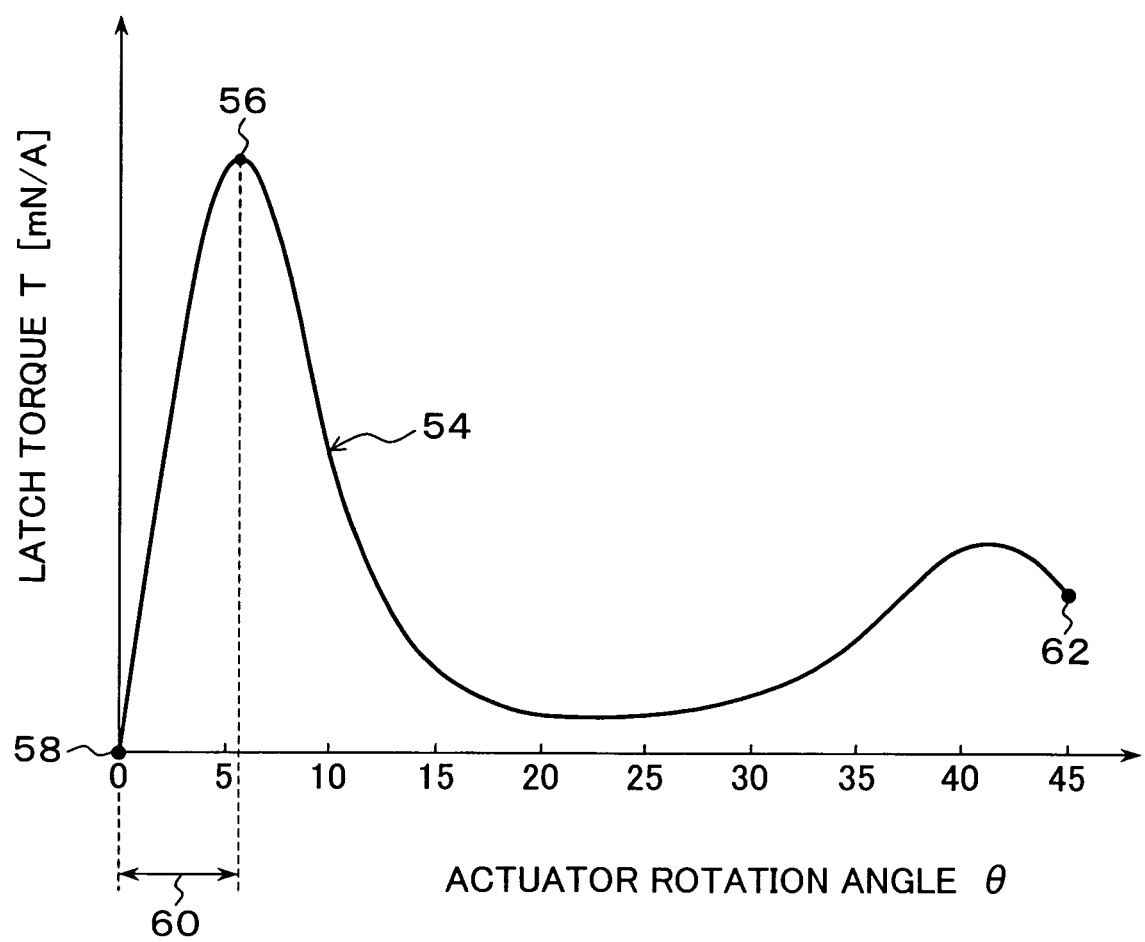
FIG. 6 is a characteristic diagram of latch torque relative to the rotation angle of the actuator of this embodiment.

FIG. 6 is a characteristic diagram of the latch torque based on the attraction force produced between the projection 46 of the magnet 36 and the latching magnet 48 relative to the actuator rotation angle θ of the rotary actuator in this embodiment. In FIG. 6, the actuator rotation angle θ is based on the assumption of a latch position θ=0° in contact with the stopper pin 38 shown in FIG. 4, and θ=45° in a case where the head in contact with the stopper 40 on the opposite side moves to the innermost position of the magnetic disk through an anticlockwise revolving. For the movement from the latch position of an actuator rotation angle θ to the innermost position, the latch torque T produced by the attraction force 50 between the projection 46 provided on the magnet 36 and the latching magnet 48 provided on the actuator assembly 18 side changes as shown by a characteristic curve 54. According to the characteristic curve 54 shown in FIG. 6, at a latch position corresponding to θ=0°, the latch torque T is T=0 at a zero point 58. By increasing the rotation angle θ through anticlockwise revolving of the actuator from the latch position, the latching magnet 48 on the actuator side relative to the projection 46 of the magnet 36 on the fixed side changes its state of overlapping as shown in FIG. 4 is separated along with rotation as shown in FIG. 5. At a stage when overlap of the projection 46 and the latching magnet 48 is reduced to an extent in which the distance thereof becomes the smallest, a maximum value of torque caused by the maximum attraction force as shown by a peak point 56 is obtained. According as the actuator rotation angle θ increases further, the latching magnet 48 leaves the projection 46 of the magnet 36, and the latch torque decreases along with the decrease in the attraction force. According to the characteristic curve 54 on the latch torque T changing relative to the actuator rotation angle θ, it is the most desirable to set a latch position at zero point 58 where the latch torque T becomes T=0. If the latch torque T is T=0 at the latch position as shown by the zero point 58, the force pressing the coil arm 30-1 against the stopper pin 38 in the state shown in FIG. 4 is zero. Since this means non-existence of a force pressing the coil arm 30-1 against the stopper pin 38 using a rubber covering or the like, it is possible to completely eliminate an attraction trouble in which the stopper pin 38 and the coil arm 30-1 attract each other and cannot be separated. Even when the latch torque is null at a latch position as described above, if there is a movement in a direction increasing the actuator rotation angle θ from the latch position, the latch torque resulting from the rotation angle sharply increases toward the peak point 56 as shown by the characteristic curve 54 in FIG. 6. Along with this increase in latch torque, it is possible to prevent separation of the actuator from the latch position and thus to maintain the latch state. When an operation is carried out by the driving of the voice coil motor from the latch position, separation from the latch position would be ensured by generating a driving torque over the latch torque at the peak point 56. In an actual apparatus, use of the zero point 58 where the latch torque becomes null as shown in FIG. 6 as a latch point cannot be perfectly ensured because of factors such as the assembling accuracy, part accuracy and the like. A latch state can however be maintained while pressing against the stopper pin 38 with the smallest possible latch torque by setting a latch position within the latch range 60 from the peak point 56 to the zero point 58. In this case as well, a latch position can be set at a position the closest possible to the zero point 58 side within the latch range 60. More specifically, as shown in FIG. 4, a latch position can be set at a position closer to the zero point 58 within the latch range 60 shown in FIG. 6 by achieving a state in which the latching magnet 48 on the actuator assembly 18 side overlaps the projection 46 of the magnet 36 to be positioned on the fixed side. In this embodiment, as is clear from FIG. 4, the latch mechanism utilizing the leaking magnetic flux based on a combination of the projection 46 of the magnet 36 on the fixed side and the latching magnet 48 on the actuator assembly 18 side is arranged at a position sufficiently the closest possible to the rotational center of the shaft 20 revolving the actuator. Since the distance to the portion of the latching magnet 48 composing the latch mechanism from the rotational center of the shaft 20 can be reduced to the minimum as described above, the inertial moment of the actuator assembly 18 can be sufficiently minimized leading to the smallest possible inertial moment. It is therefore possible to improve the revolving speed upon seeking the actuator through energizing of the coil 32 from the latch position, i.e., the head speed upon seeking.

Figure 7:
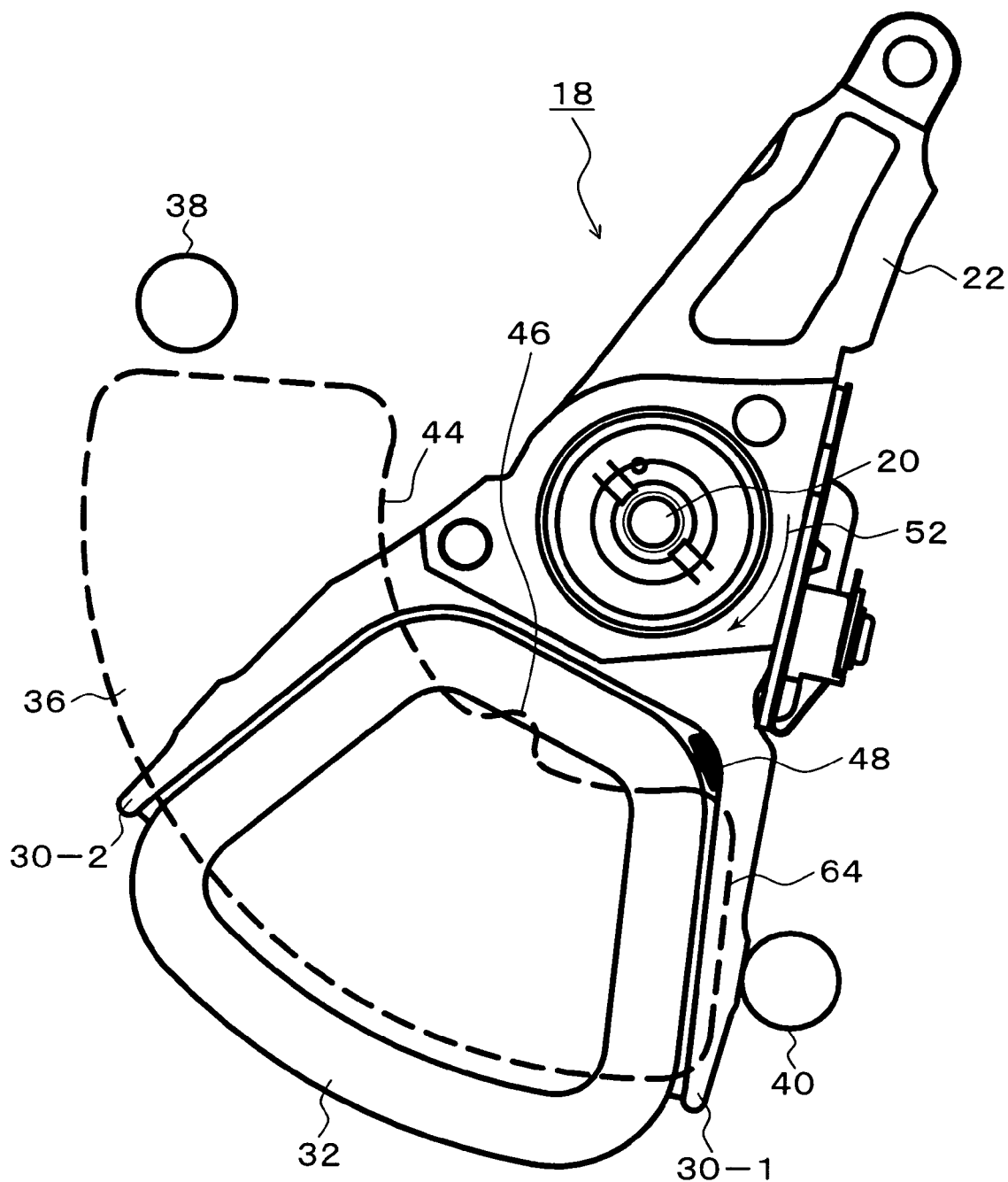
FIG. 7 is a descriptive view of an embodiment in an operating state to a stopper position opposite to the latching position.

FIG. 7 is a description view of the operating state at the stopper position opposite to the latch position in this embodiment. The position where the outside of the coil arm 30-2 of the actuator assembly 18 is in contact with the stopper pin 40 is in a state in which the head has moved to the innermost position of the magnetic disk, i.e., the actuator rotation angle θ in the characteristics of the latch torque T in FIG. 6 is set at θ=45°. A point to be noted in this embodiment is that, when moving the actuator assembly 18 to the stopper position opposite to the latch position shown in FIG. 7, a function of substantially improving the Blr property of the rotary actuator is obtained under the effect of the attraction force brought about by the latching magnet 48 provided for latching and leaking magnetic flux from the magnet side 64 end of the magnet 36.

Figure 8:
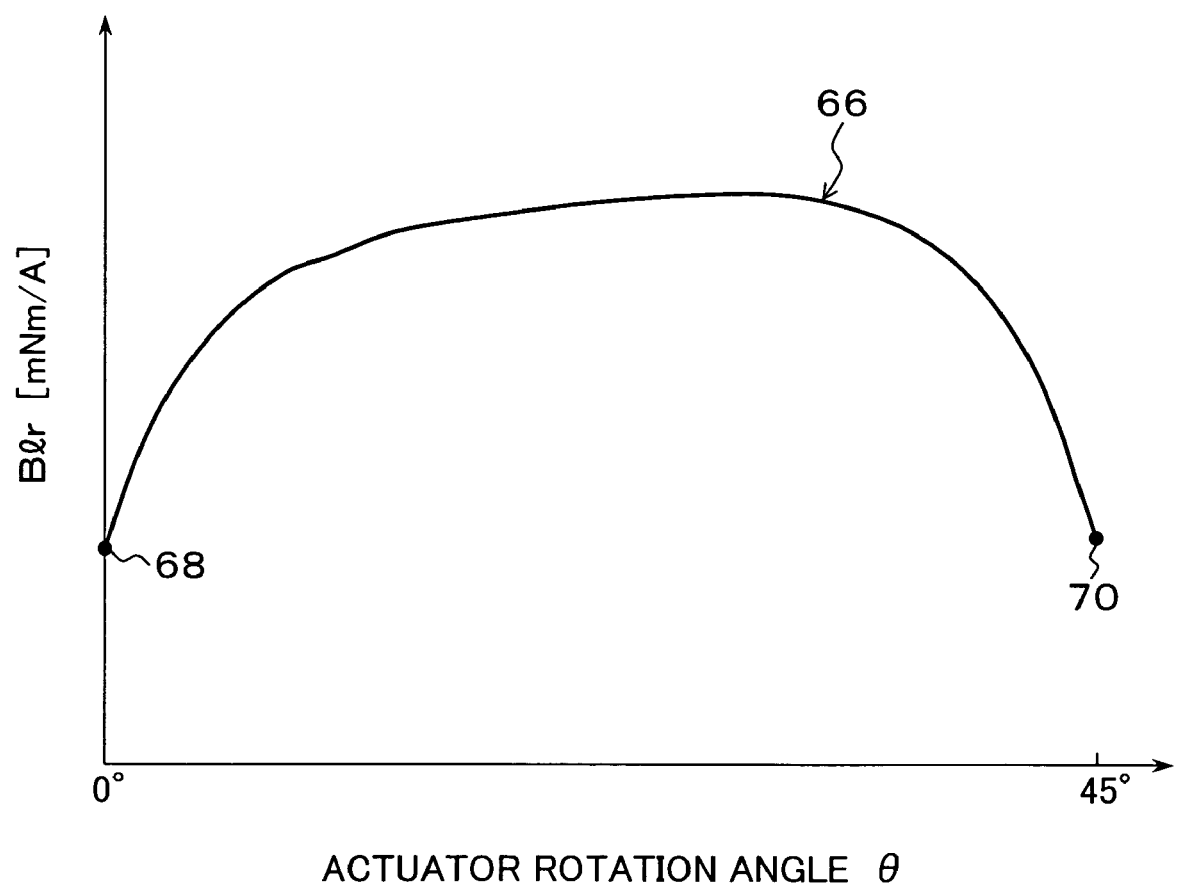
FIG. 8 is a characteristic diagram of Blr relative to the actuator rotation angle in this embodiment.
Figure 9:
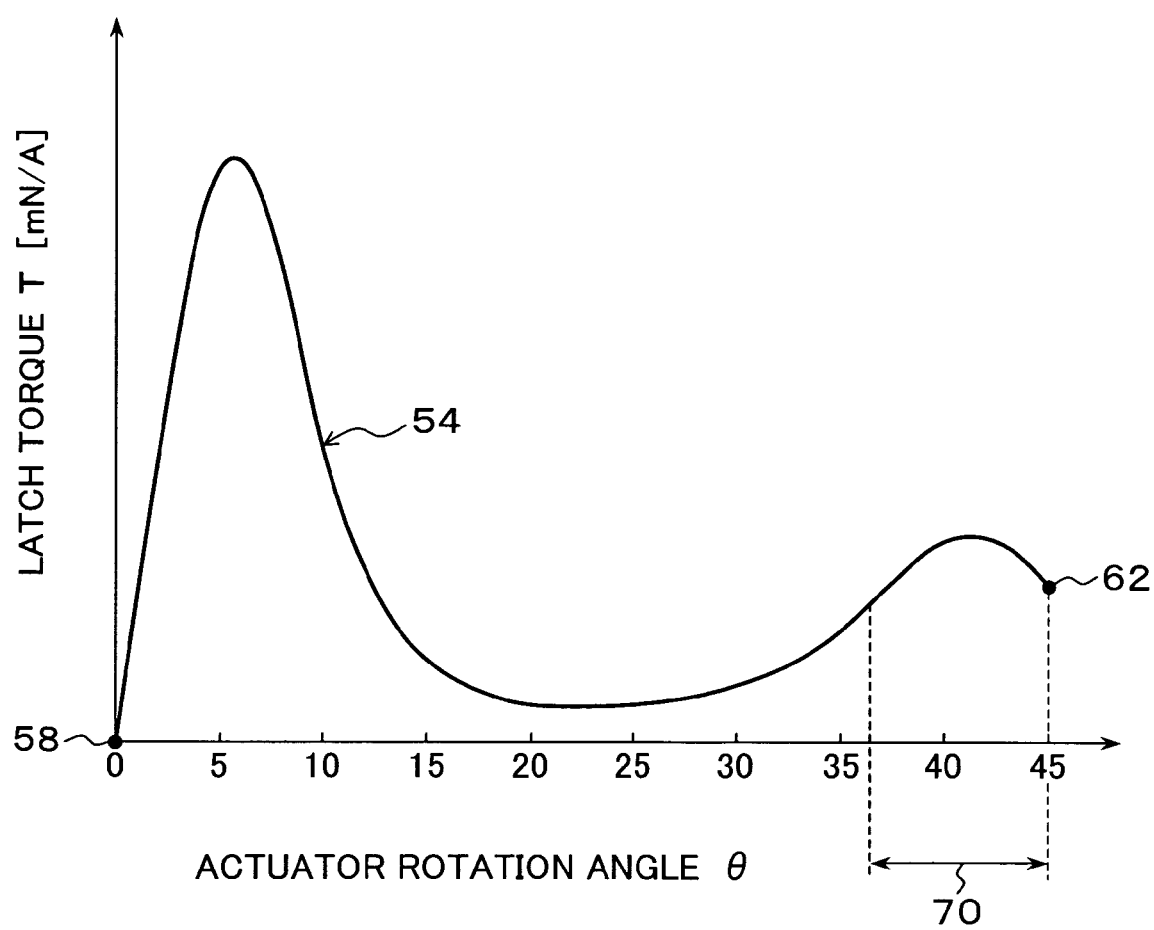
FIG. 9 is a descriptive view of latch torque which improves the Blr property near the stopper position opposite to the latching position.

FIG. 8 is a characteristic diagram illustrating a change in Blr of the voice coil motor caused by the magnet circuit and the coil 32 relative to the actuator rotation angle θ in a case where a latching magnet 48 is not provided in this embodiment. In FIG. 8, the characteristic curve 66 of Blr is characterized in that it decreases from the latch position where the actuator rotation angle θ is θ=45° toward the stopper pin position 70 on the opposite side. The drop of the Blr characteristic curve 66 is caused by the fact that, according as the coil 32 on the actuator side approaches the side end of the magnet 36 at the latch position shown in FIG. 4 and the opposite stopper position shown in FIG. 10, the number of magnetic fluxes perpendicular to the coil 32 is reduced. To cope with this tendency of the Blr characteristic curve 66 relative to the actuator rotation angle θ, in this embodiment, the projection 46 is provided on the magnet 36, and the latching magnet 48 is provided on the actuator side to form the latch mechanism. As a result, a latch torque having a characteristic curve 54 relative to a change in the actuator rotation angle θ is available as shown in FIG. 9. As shown in FIG. 8, the latch torque has originally a function for holding the rotary actuator on the zero point 58 side where θ is 0°. When the actuator assembly 18 is moved to the side opposite to the latch position as shown in FIG. 7, the latch torque gradually increases according as it moves toward θ=45° at which it comes into contact with the stopper pin 40 on the opposite side. After the peak point is reached near θ=40°, the latch torque decreases, and then increases until the stopper pin position 62 is reached. However, the change in the latch torque on the side opposite to the latch positions has no sense as a torque for latching.

The reason of the increase in latch torque at the stopper position opposite to the latch position is as follows. As shown in FIG. 7, when the actuator assembly 18 approaches the stopper pin 40, the latching magnet 48 provided in the actuator assembly 18 comes closer to the magnet side end 64 to the right of the magnet 36. An attraction force is produced between the latching magnet 48 and leaking magnetic flux from the magnet side end 64, and along with an increase in this attraction force, the latch torque increases on the side opposite to the stopper position as shown in FIG. 9. Such an increase in latch torque on the side opposite to the latch position produces a latch torque 52 which energizes the actuator assembly 18 clockwise in the state shown in FIG. 7. When seek control is to be carried out by driving the actuator assembly 18 from the stopper pin position to the outer side of the magnetic disk, i.e., anticlockwise, the latch torque 52 acts in a direction making up the driving torque caused by the coil 32 and the magnet 36. More specifically, the driving torque of the voice coil motor depends upon the characteristic curve 66 of Blr shown in FIG. 8: it decreases at the stopper pin 70 giving θ=45°, and this decrease can be made up by a compensation range 72 which is the increasing portion of the latch torque on the side of a rotation angle θ=45°. Under the effect of latch torque on the side opposite to the latch position, therefore, it is possible to substantially avoid reduction of Blr near the stopper pin position 70 opposite to the latch position in FIG. 8, and increase the head speed based on actuator revolution from the stopper position opposite to the latch position. In the case of a reckless run in the inner stopper direction, it plays the role of a brake.

Figure 10:
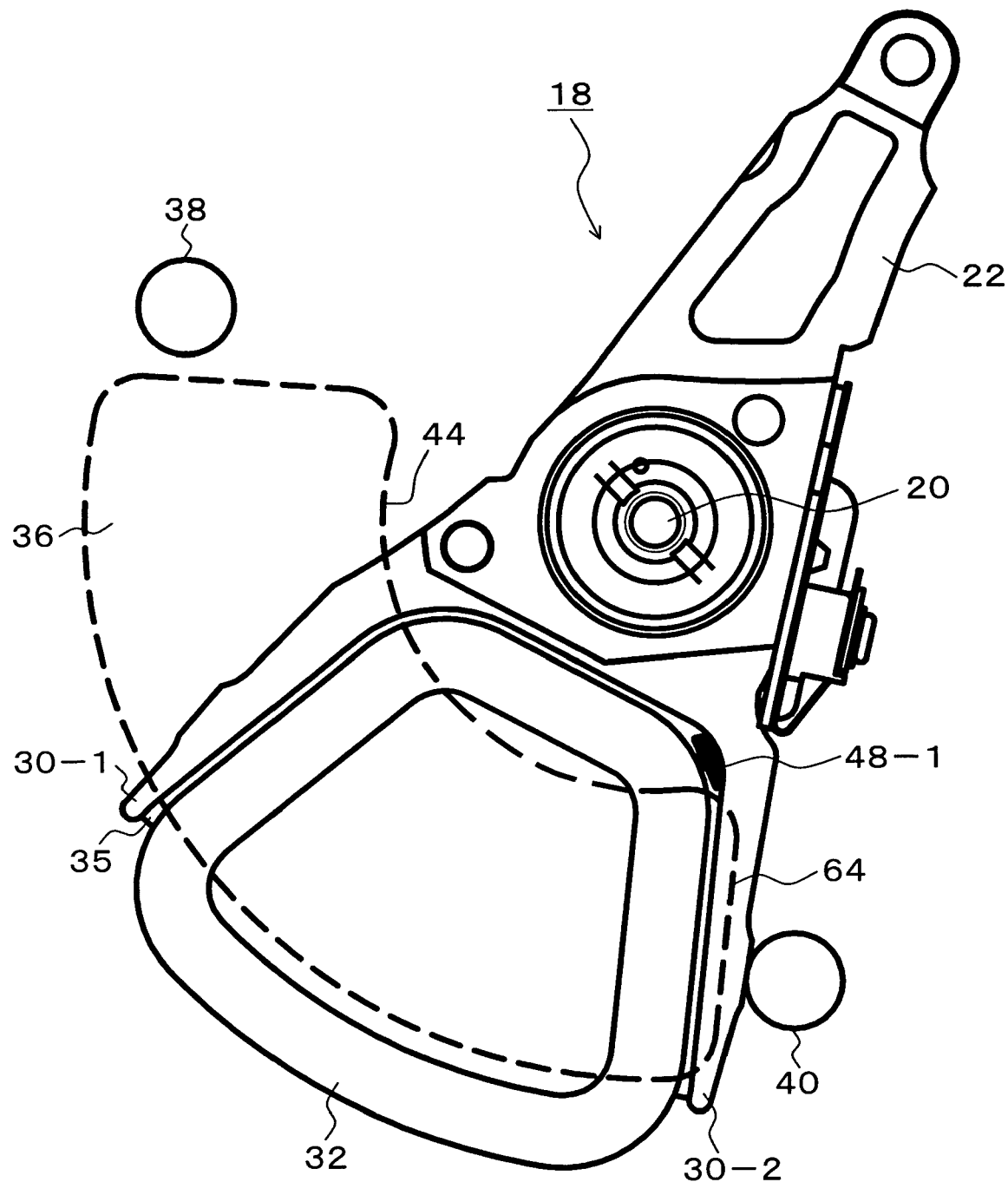
FIG. 10 is a descriptive view of another embodiment which improves the Blr property near the stopper position opposite to the latching position.

FIG. 10 is a descriptive view of another embodiment for improving the Blr property near the stopper position opposite to the latch position. In FIG. 7, because of the structure comprising the projection 46 of the magnet 36 forming the latch mechanism and the latching magnet 48 on the actuator side corresponding thereto, a function of improving the Blr property by latch torque at the stopper position opposite to the latch position. However, without implementing the function of the latch mechanism, attachment of an compensating magnet 48-1 to the actuator assembly 18 as in the embodiment shown in FIG. 10 makes available an improving effect of the Blr property by the latch torque at a position opposite to the latch position as in the embodiment shown in FIG. 7 having an object to provide the latch mechanism shown. In the embodiment shown in FIG. 10, a projection 46 as in the embodiment of FIG. 7 is not formed on the magnet inner periphery 44 of the magnet 36. Only the compensating magnet 48-1 corresponding to the latching magnet 48 in FIG. 7 is attached on the actuator assembly 18 side. Under the effect of the embodiment shown in FIG. 10, by use of the attraction force brought by the leaking magnetic flux from the compensating magnet 48-1 and the magnet 36, it is possible to substantially make up the decrease in Blr in the state in which the coil 32 approaches the magnet end 64 of the magnet 36 in contact with the stopper pin 40 on the side opposite to the latch position.

Figure 11:
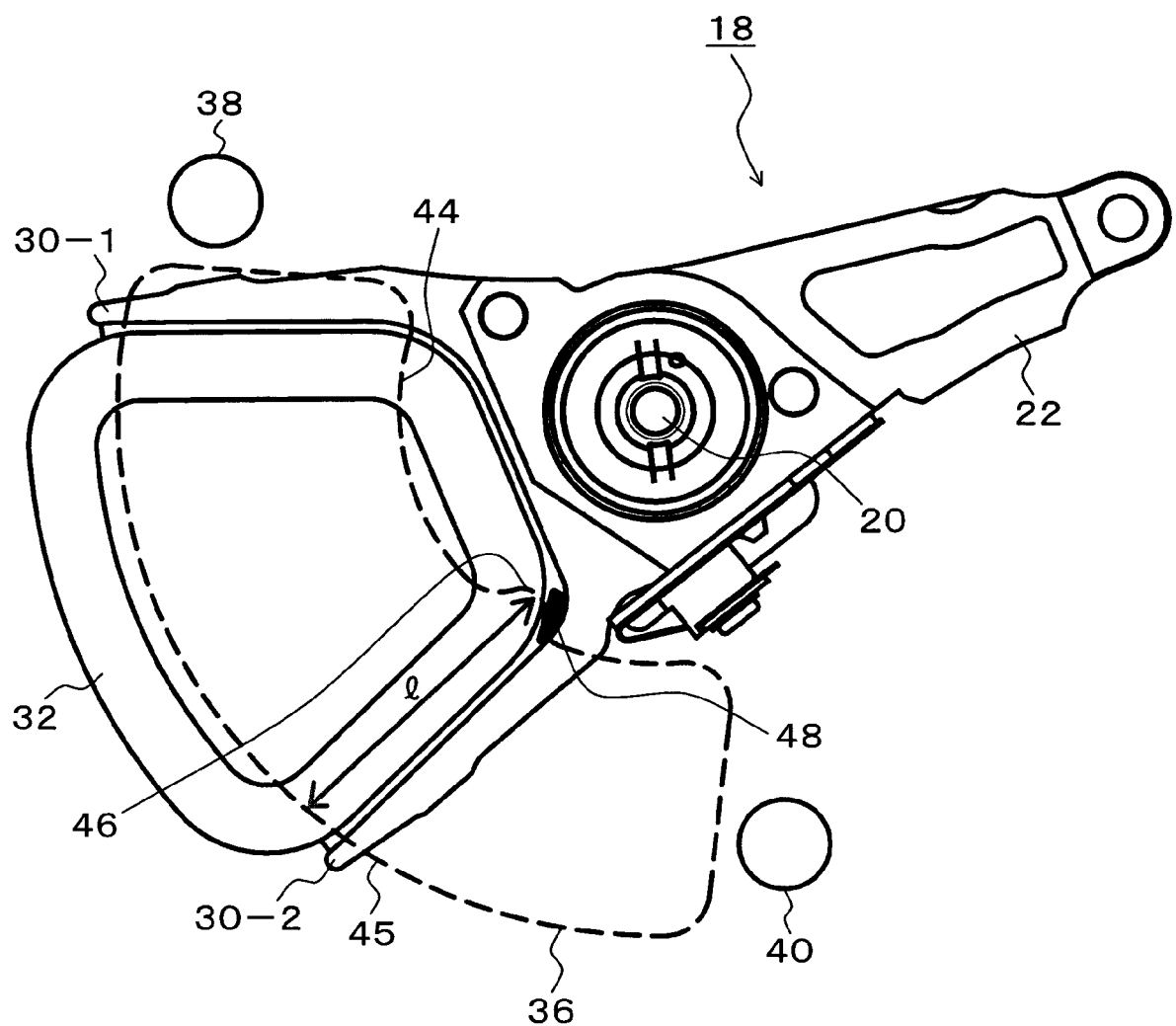
FIG. 11 is a descriptive view illustrating an increase in the coil effective length near the latching position.

FIG. 11 is a descriptive view of this embodiment in which the coil effective length increases near the latch position. FIG. 11 illustrates a state in which the latching magnet 48 attached to the actuator assembly 18 approaches the projection 46 provided on the magnet inner periphery 44 of the magnet 36. When the attention is given to the effective length l of the coil 32 relative to the magnet 36 in this case, the effective length l of the coil 32 relative to the magnet 36 increases by a length corresponding to the provided projection 46 at the position where the side end portion of the coil 32 shown overlaps the projection 46. When the effective length l of the coil 32 relative to the magnet 36 increases as described above, Blr of the voice coil motor controlling the driving torque increases along with the increase in the coil effective length l.

Figure 12:
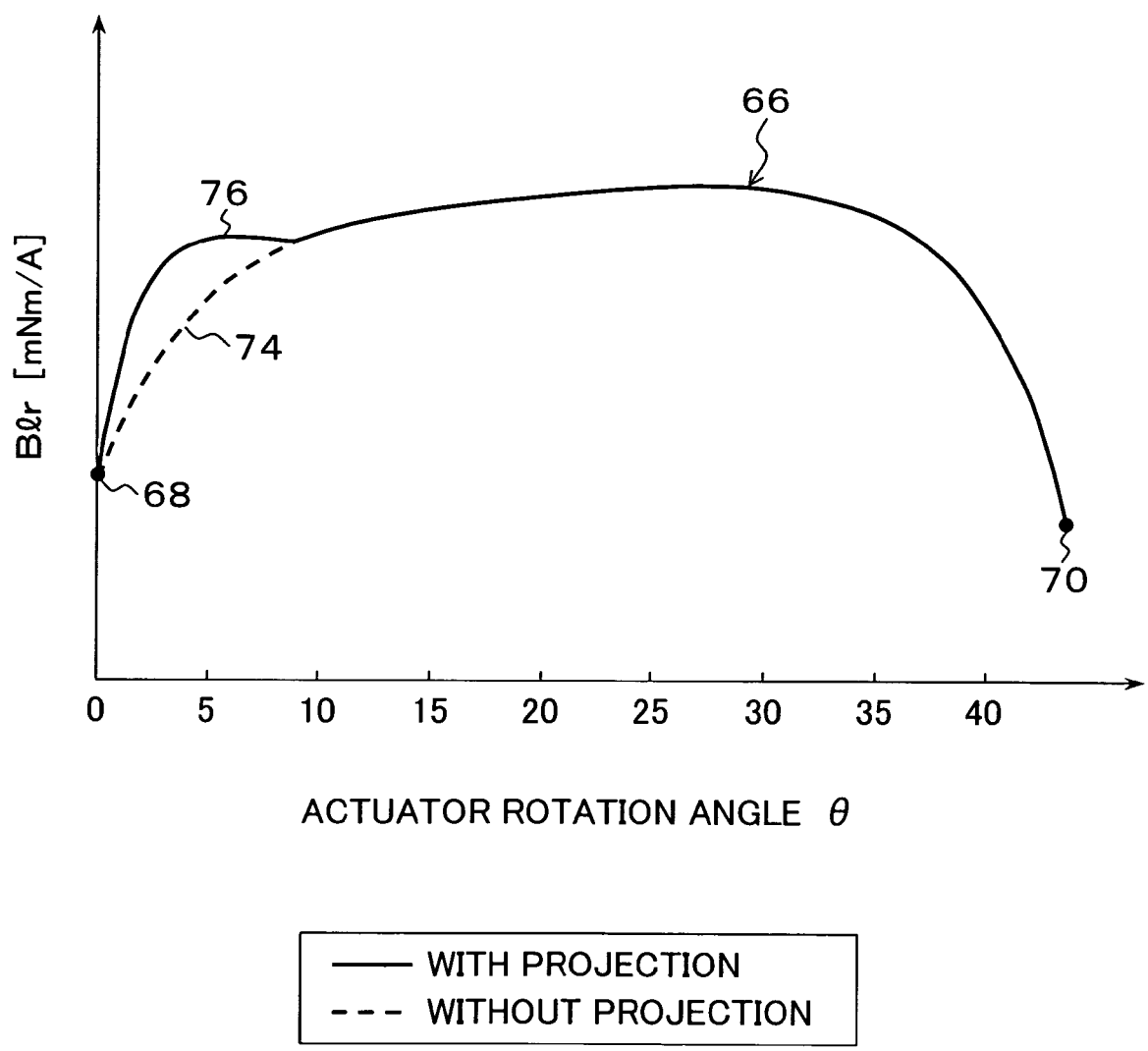
FIG. 12 is a descriptive view of the Blr property improved near the latching position resulting from an increase in the coil effective length.

FIG. 12 is a descriptive view illustrating the Blr property relative to the actuator rotation angle θ in this embodiment. In FIG. 12, the characteristic curve 66 represents a case where a projection 46 is not provided on the latch side corresponding to an actuator rotation angle θ of 0. In this case, there is no particular increase in the coil effective length on the latch side, but it is reduced as shown by the characteristic curve 74 in a broken line and reaches the latch point 68. In this embodiment, in contrast, the coil effective length l increases immediately before reaching the latch position as a result of provision of the projection 46 on the magnet 36 as shown in FIG. 11. As shown by the characteristic curve 76 of FIG. 12, therefore, Blr increases along with the increase in the coil effective length l relative to the conventional characteristic curve 74. It is thus possible to improve Blr on the latch side. If Blr of the voice coil motor on the latch side can be improved as indicated by the characteristic curve 76, the driving torque upon performing seek operation through separation from the latch position increases by the increment of the coil effective length caused by the projection 46 even with constant current, thus permitting improvement of the head speed when seeking from the latch position.

Figure 13:
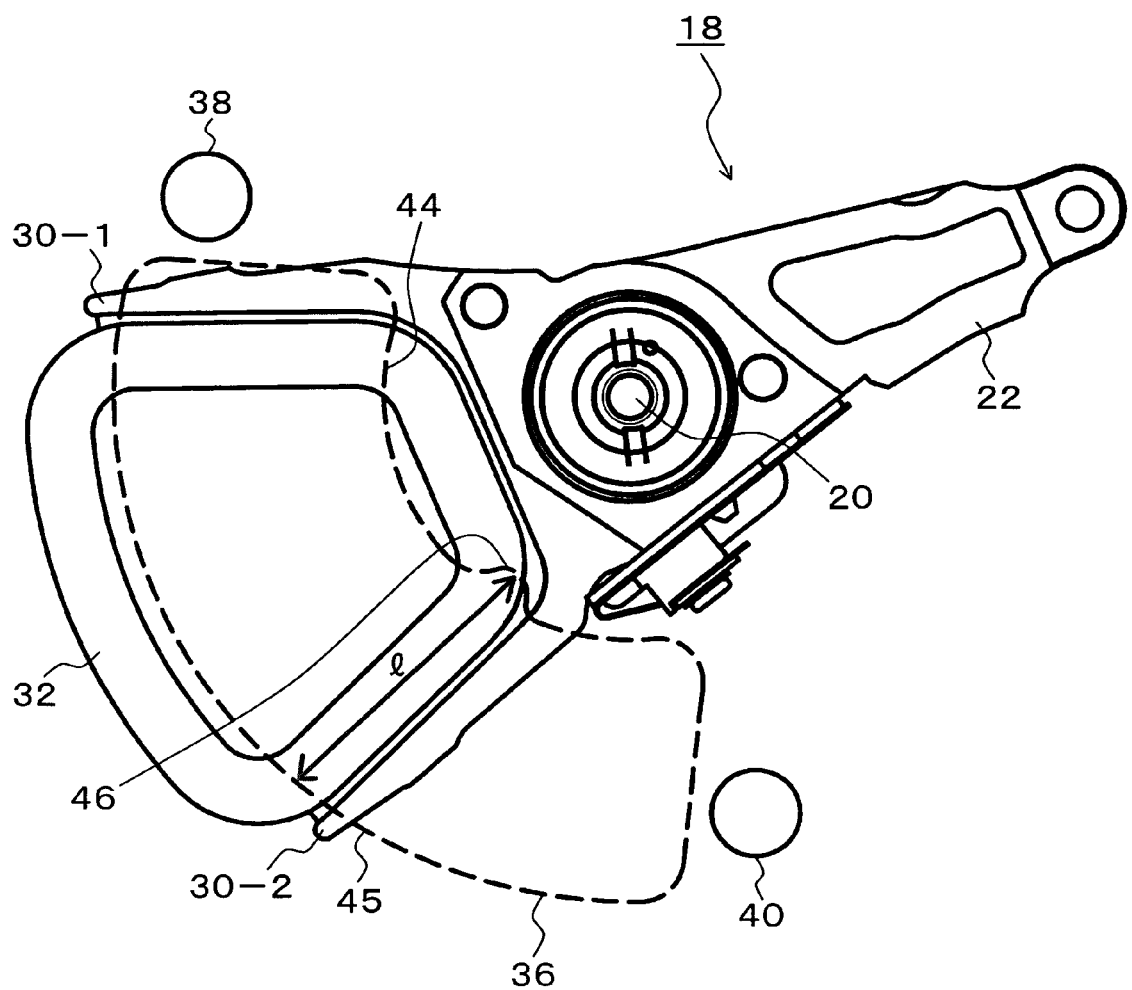
FIG. 13 is a descriptive view of another embodiment which improves the Blr property near the latching position.

FIG. 13 is a descriptive view of another embodiment for improving the Blr property near the latch position. Improvement of the Blr property on the latch side resulting from provision of the projection 46 and the latching magnet 48 composing the latch mechanism shown in FIG. 11 is achieved by providing the projection 46 on the magnet 36 side. The embodiment shown in FIG. 13 is therefore characterized in that the projection 46 is provided on the magnet inner periphery 44 so that the side end portion of the coil 32 overlaps the projection 46 near the latch position, not as a latch mechanism, but as an embodiment for improving Blr on the latch position side. By providing the projection 46 so as to overlap the coil near the latch position as described above, the improvement effect of Blr as shown by the characteristic curve 76 illustrated in FIG. 12 is available.

Figure 14:
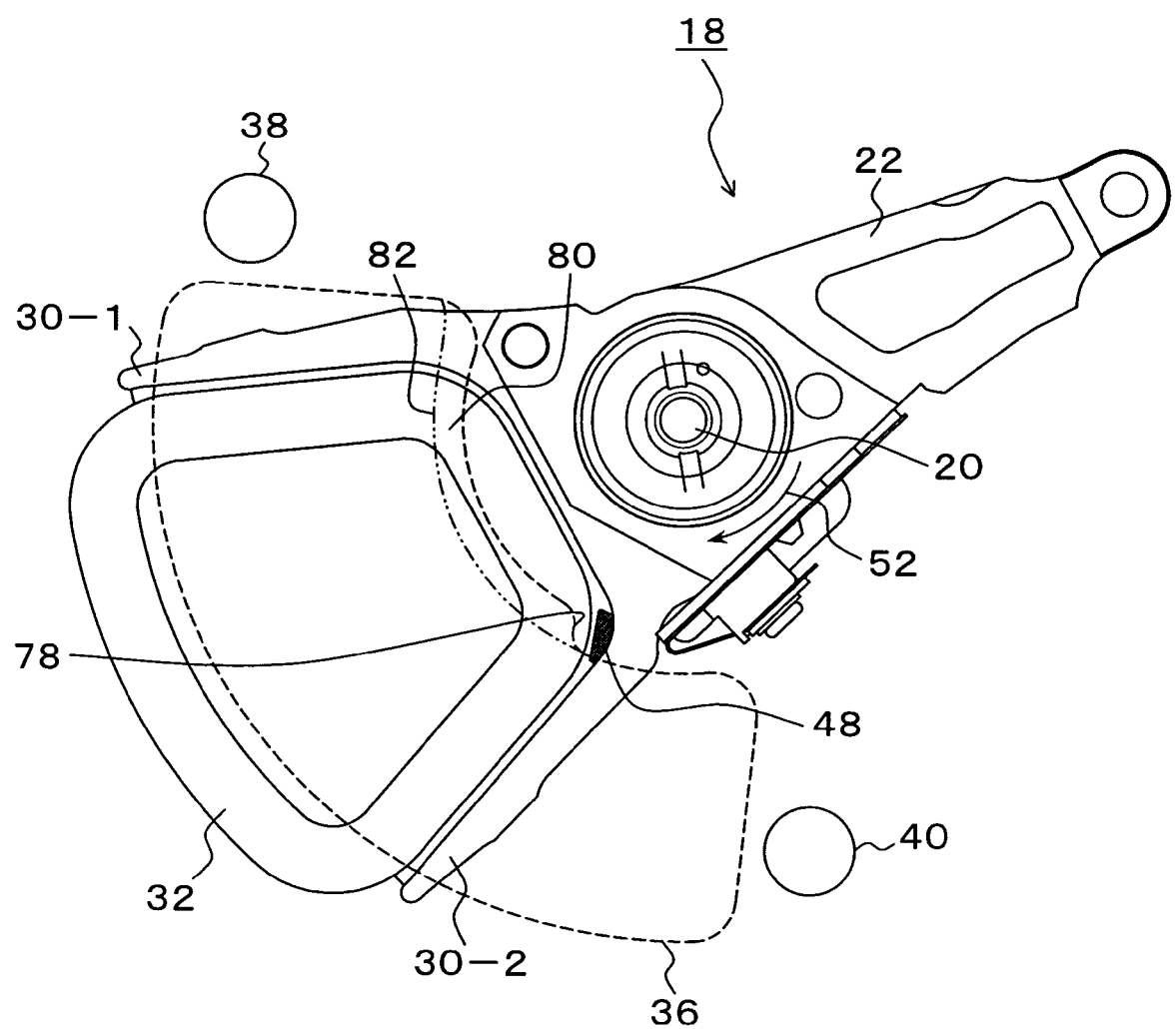
FIG. 14 is a descriptive view of another embodiment in which a step is provided on the inner periphery of the magnet of a magnetic circuit.

FIG. 14 is a descriptive view of another embodiment in which a step is provided on the magnet inner periphery of the magnetic circuit. In FIG. 14, a step 78 is formed on the inner periphery of the magnet 36, and a latching magnet 48 is attached to the root of the inside of the coil arm 30-2 on the actuator assembly 18. The step 78 is provided by forming an arcuate overhang 80 so as to form the step 78 in the inside of an assumed magnet inner periphery 82 shown by an imaginary line being the magnet inner periphery of the magnet 36 before providing the step 78. Also in a case where a step 78 is provided on the magnet 36 side and a latching magnet 48 is provided on the actuator assembly 18 side in correspondence thereto, as in the embodiment shown in FIG. 4, a latch torque 52 caused by the attraction force between leaking magnetic flux of the step 75 and the latching magnet 48 is produced clockwise relative to the rotational center according as the latch position becomes nearer. For the latch torque 52, there is available a torque property in which until the latching magnet 48 overlaps the step 78 portion at the latch position in contact with the stopper pin 38, similarly to the case shown in FIG. 6, the latch torque decreases across the peak point according as the latch position is nearer, and then, is reduced to zero point. By setting the latch position within a latch range 60 from the peak point 56 to the zero point, it is possible to achieve a latch mechanism which enables to press down against the stopper pin 38 with a smaller latch torque. The latch portion based on the step 78 and the latching magnet 48 has of course the smallest radius to the rotational center of the actuator assembly 18. This makes it possible to improve the head speed upon separation from the latch position by minimizing the inertial moment. The step 78, forming the overhang 80 on the inner periphery of the magnet 36, causes an increase in the effective length of the coil 32 relative to the magnet 36 by a length corresponding to the portion of the provided overhang 80, resulting in a possibility to increase the Blr property of the voice coil motor.

Figure 15:
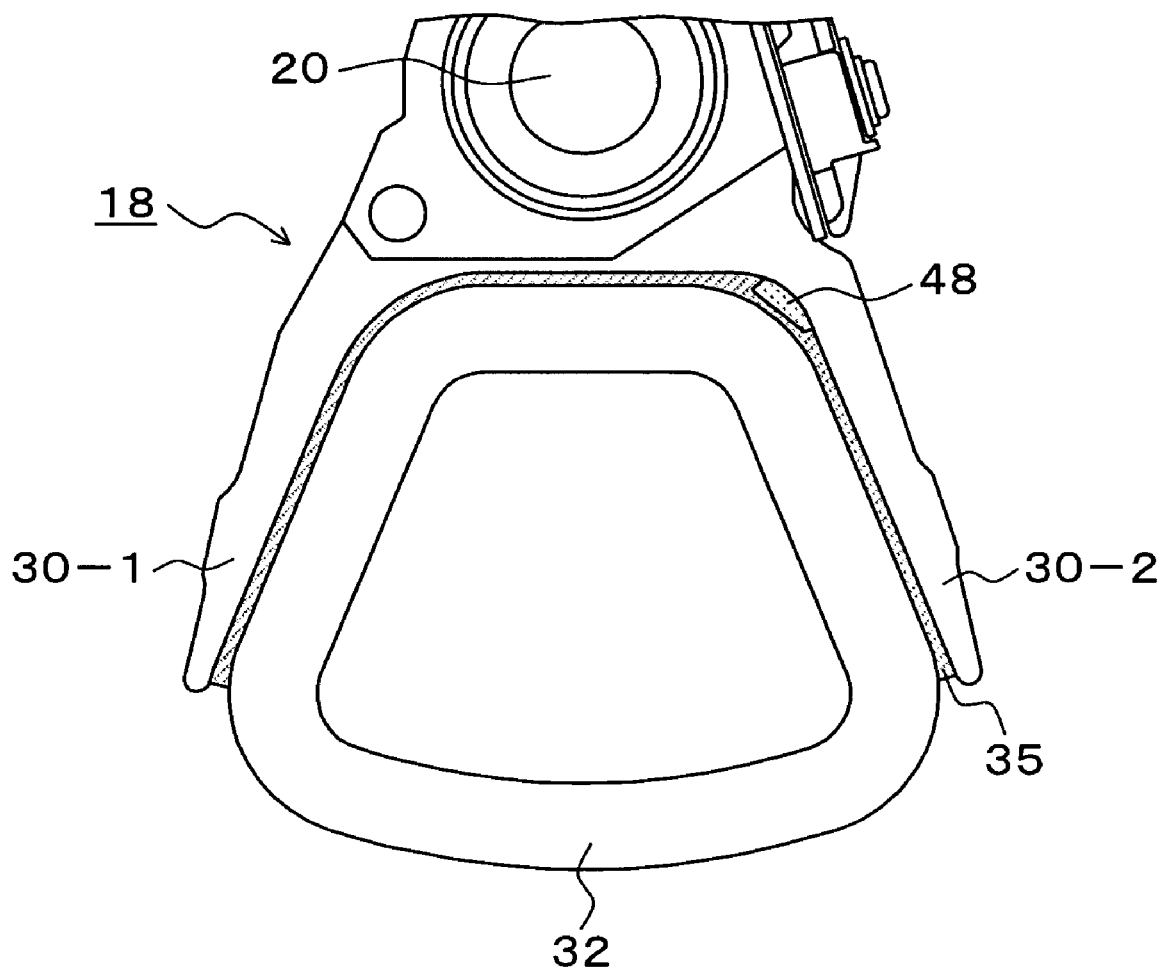
FIG. 15 is a descriptive view of still another embodiment in which a latching magnet is held in a bonding layer between coil arms of the coil.

FIG. 15 illustrates an embodiment of the attachment structure of the latching magnet on the rotary actuator side. This embodiment is characterized in that the latching magnet 48 is arranged in the bond layer 35 which secures the coil 32 to the coil arms 30-1 and 30-2 in the rear of the actuator assembly 18, bonded and secured. Apart from securing of the coil 32 by the bond layer 35, the coil 32 may be mold-secured. In this mold-securing, it is enough to mold-secure the latching magnet 48.

Figure 16:
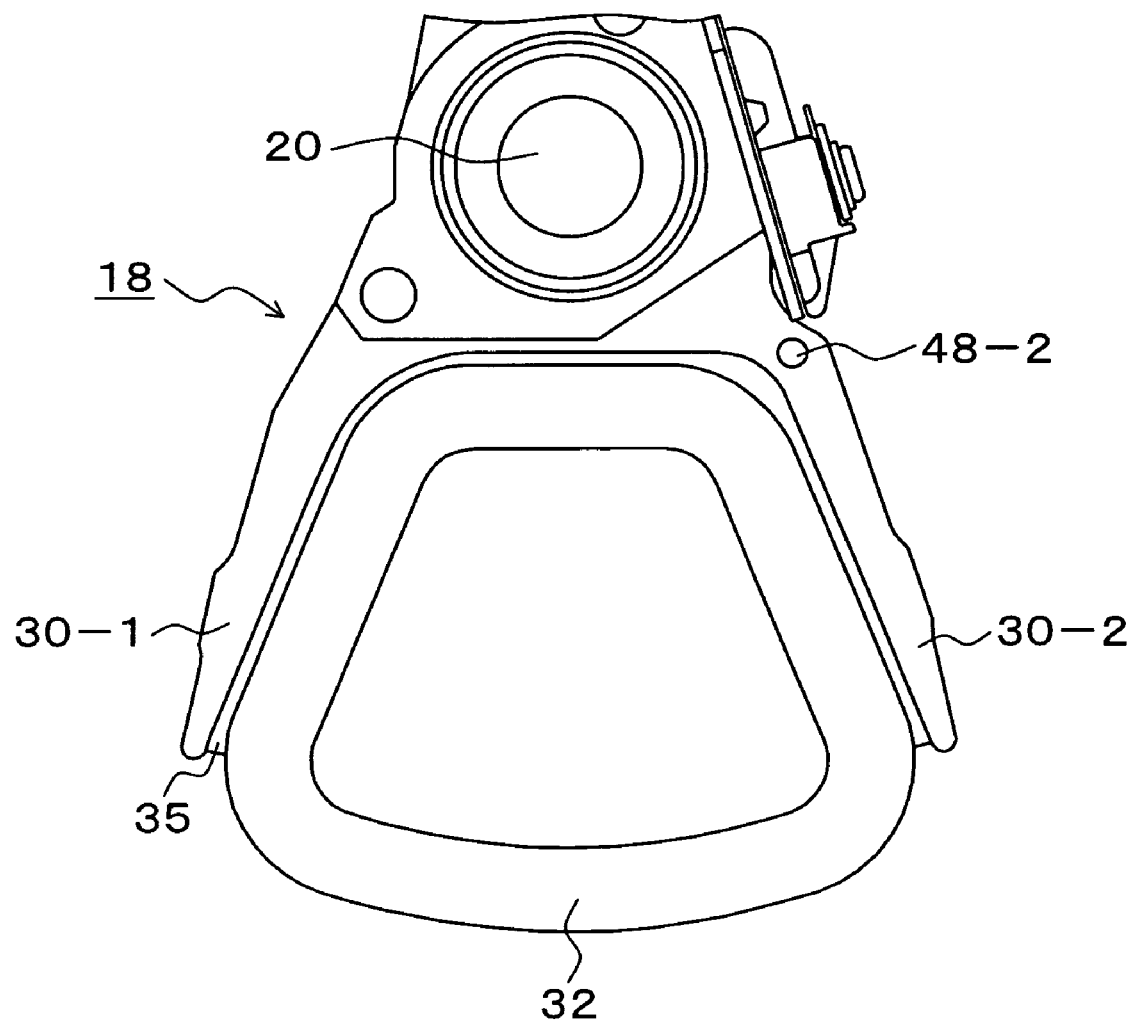
FIG. 16 is a descriptive view of further another embodiment in which a latching magnet is attached near the foot of the coil arm.

FIG. 16 is a descriptive view of another embodiment of the attachment structure of the latching magnet to the rotary actuator side. In this embodiment, an attachment hole is pierced near the root of the coil arm 30-2 in the rear of the actuator assembly 18, and the latching magnet 48-2 is engaged into this hole and secured.

Figure 17:
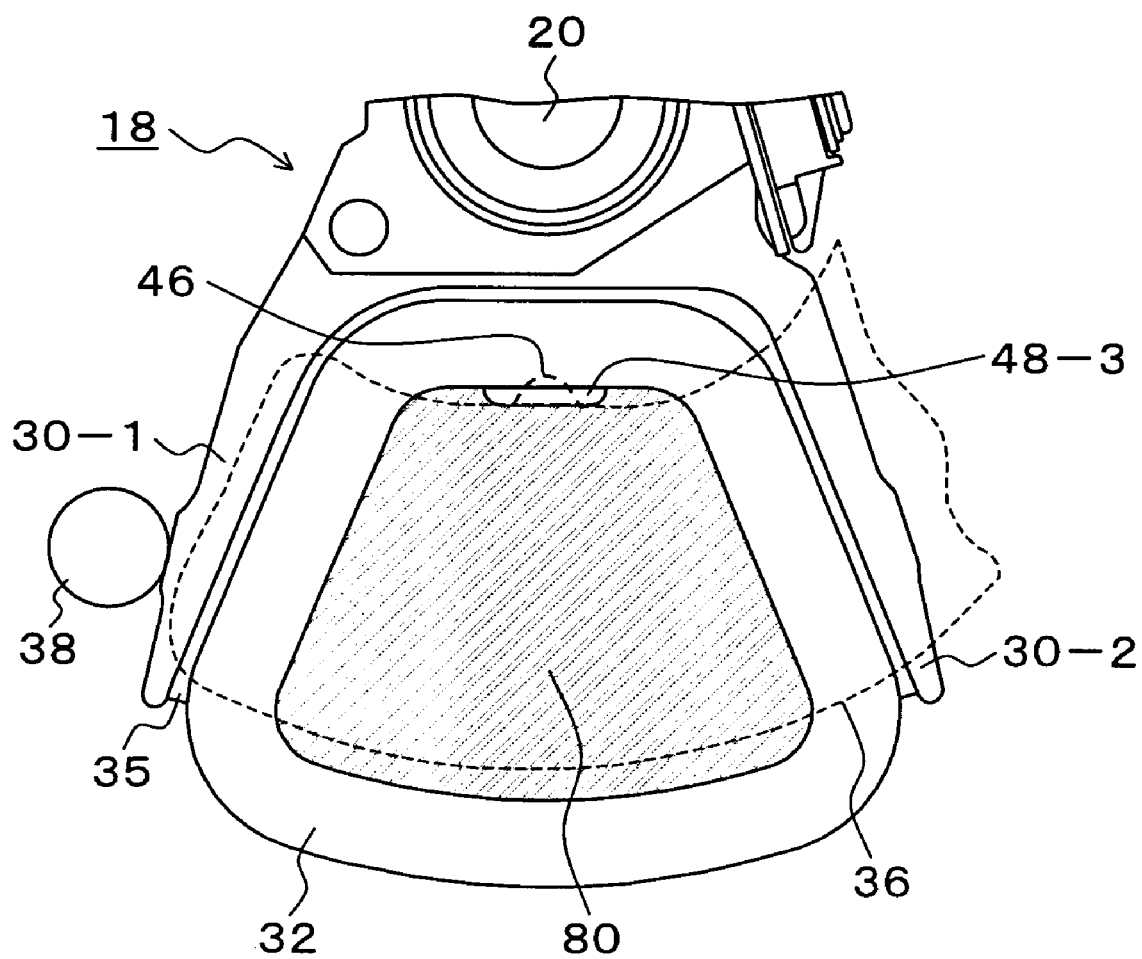
FIG. 17 is a descriptive view of another embodiment in which a latching magnet is attached to the inner periphery of the coil.

FIG. 17 illustrates still another embodiment of the attachment structure of the latching magnet to the actuator assembly. This embodiment covers a case where an insert mold 84 is provided in the coil 32. In this case, the latching magnet 48-3 is arranged on the inner periphery side positioned in the coil 32, and secured by the insert mold 84. When the actuator assembly 18 is at the latch position, the projection 46 formed on the magnet inner periphery of the magnet 36 overlaps the latching magnet 48-3 secured by the insert mold 84.

In the above-mentioned embodiments, the projection 46 or the step 78 serving as the attracting member on the magnetic circuit side composing the latch mechanism is provided on the magnet inner periphery 44 of the magnet 36. The projection or the step may be provided on the yoke side as another embodiment. The present invention includes appropriate variations without impairing the object and advantages thereof, and is not limited by the numerical values shown in the above-mentioned embodiments.

What is claimed is:

1. A disk apparatus comprising:
   an actuator assembly which is rotatably attached to an enclosure base, supports a head at an end thereof via an arm, and supports a coil at the other end thereof; and
   a magnetic circuit unit which is secured to said enclosure base and has a yoke and a magnet;
   wherein said disk apparatus further comprises:
   an attracting member which is arranged at a position from an inner peripheral end of a magnet provided in said magnetic circuit unit toward a rotational center; and
   a latch member which generates an attraction force directed toward said latching position between said attracting member and itself near a latching position where said actuator assembly is in contact with a stopper.

2. The disk apparatus according to claim 1, wherein said attracting member is a projection which is a partial extension of a substantially arcuate inner peripheral end of said magnet, directed toward the rotation center.

3. The disk apparatus according to claim 1, wherein said attracting member is a step formed at a substantially arcuate inner peripheral end of said magnet.

4. The disk apparatus according to claim 3, wherein said step is formed by overhanging into a substantially arcuate shape from a prescribed position of said magnet.

5. The disk apparatus according to claim 1, wherein said attracting member and a latching member are arranged so that the attraction force becomes the maximum immediately before said latching position, and is reduced according as these members approaches the latching position coming into contact with said stopper.

6. The disk apparatus according to claim 1, wherein said attracting member and the latching member are arranged so that the attraction force becomes the maximum at a position where said projection and the latching member become the closest to each other without overlapping each other, the attraction force becoming lower according as the extent of overlapping of said projection and the latching member becomes larger, and the attraction force becomes substantially null at the latching position where it comes into contact with the stopper.

7. The disk apparatus according to claim 1, wherein said latching member is inserted and held between the coil arm of said actuator assembly and said coil and secured there.

8. The disk apparatus according to claim 1, wherein said latching member is attached to the coil arm of said actuator assembly.

9. The disk apparatus according to claim 1, wherein said latching member is attached to the coil inner periphery of said actuator assembly.

10. The disk apparatus according to claim 1, wherein said attracting member is provided in the yoke of said magnetic circuit.

11. The disk apparatus according to claim 1, wherein said actuator assembly has a latching position set at a position where the head is retracted in a ramp mechanism arranged at a position off the outer periphery of a disk mechanism.

12. The disk apparatus according to claim 1, wherein said actuator assembly has a latching position set at a position where the head is retracted in a contact start/stop region of the innermost periphery of the disk medium.

13. A disk apparatus comprising:
    an actuator assembly which is rotatably attached to an enclosure base, supports a head at an end thereof via an arm, and supports a coil at the other end thereof; and
    a magnetic circuit unit which is secured to said enclosure base and has a yoke and a magnet;
    wherein said disk apparatus further comprises:
    a latching member provided in said actuator assembly so as to generate an attraction force in a direction leaving said stopper pin when said actuator assembly is at a position in contact with the stopper pin on the side opposite to the latching position and the proximity thereof.

14. A disk apparatus comprising:
    an actuator assembly which is rotatably attached to an enclosure base, supports a head at an end thereof via an arm, and supports a coil at the other end thereof; and
    a magnetic circuit unit which is secured to said enclosure base and has a yoke and a magnet;
    wherein said disk apparatus further comprises:
    a projection or a step provided in said magnet so as to expand the effective length of the coil of said actuator assembly relative to said magnetic circuit when said actuator assembly is at a position in contact with the stopper pin at the latching position and the proximity thereof.

* * * * *